United States Patent [19]

Gregory

[11] Patent Number: 4,498,293

[45] Date of Patent: Feb. 12, 1985

[54] HYDRAULIC LOG SPLITTER

[75] Inventor: Jack T. Gregory, Penngrove, Calif.

[73] Assignee: Gregory Tool Systems, Inc., Sonoma, Calif.

[21] Appl. No.: 479,795

[22] Filed: Mar. 28, 1983

[51] Int. Cl.$^3$ .............................................. F16D 31/02

[52] U.S. Cl. ........................................ 60/478; 60/479; 60/481; 144/193 A; 417/554

[58] Field of Search ................. 60/477, 478, 479, 480, 60/481, 482; 417/554, 546; 144/193 A, 193 R, 3 K; 91/216 B

[56] References Cited

U.S. PATENT DOCUMENTS 1,047,007 12/1912 Drugan ................................ 60/479
2,624,174 1/1953 Loef ...................................... 60/481
3,874,821 4/1975 Nagorski et al. ................. 60/481 X
4,239,070 12/1980 Burns ............................. 144/193 A
4,351,377 9/1982 Hamel ............................ 144/3 K X
4,411,298 10/1983 Ellingsen et al. ............... 144/193 A

*Primary Examiner*—Robert E. Garrett
*Assistant Examiner*—Timothy E. Nauman
*Attorney, Agent, or Firm*—Melvin R. Stidham

[57] ABSTRACT

A force-delivering tool such as a log splitter wherein a pusher member carried on a cylinder is forced against a blade carried on a frame to which the piston is secured. The cylinder is driven relative to the piston by means of a reciprocating plunger carrying a cup on the end that forces fluid past a one-way valve ahead of the piston. Oil is pressurized by both the bottom of the cup and its annular end but, when resistance is encountered to build up pressure, a relief valve evacuates the annular chamber so that all the force is concentrated in the area at the bottom of the cup. The entire actuating valve may be backed away to relieve pressure as desired or at the completion of a desired stroke.

12 Claims, 6 Drawing Figures

HYDRAULIC LOG SPLITTER

BACKGROUND OF THE INVENTION

Generally, hydraulic force-delivering tools of sufficient strength to split logs are rather substantial in size, requiring large hydraulic rams, together with pumps and motors of sufficient capacity to handle the load. As a result, the hydraulic log splitters are generally not affordable by a large segment of the public. Moreover, even for those who can afford them, they are generally too heavy and cumbersome to move about from place to place and are, therefore, generally mounted in a permanent location. In the meantime, with the growing energy crisis, there is an increased interest in wood burning stoves and in cutting logs for use as fuel. Accordingly, sales of chain saws have increased substantially, and there is a great demand for affordable and portable log splitters to complement their use.

OBJECTS OF THE INVENTION

It is an object of this invention to provide a log splitter which can deliver a substantial force with a relatively small cylinder and a small, inexpensive power unit.

It is a further object of this invention to provide a log splitter that is portable and that can readily be moved from site to site.

It is a further object of this invention to provide a hydraulic log splitter that is simple in construction and reliable in operation.

Other objects and advantages of this invention will become apparent from the description to follow, particularly when read in conjunction with the accompanying drawings.

SUMMARY OF THE INVENTION

The log splitter of this invention comprises a pusher member mounted on a carriage that rolls along a box frame to push a log against a stationary blade on the frame. A hollow piston rod is secured to the frame and the carriage is secured to the cylinder that is pushed forward as fluid is pumped ahead of the piston. The hydraulic power unit is contained in the piston rod and includes a reciprocating cupped plunger that slides in a bore, with the cup also being slidable on a cylindrical, tubular guide in communication with the outlet passageway. Fluid is introduced to the annular space around the tubular guide in front of the cup as well as to the bottom of the cup itself so that the full circular cross-sectional area of the cup is normally active to pump fluid as a plunger reciprocates. However, in the event of resistance, which builds up pressure, a relief valve allows the fluid in the annular area to evacuate to the reservoir so that the entire force is concentrated in the area of the cup bottom for increased unit pressure. Upon completion of a given stroke, the entire valve body is cam-actuated to back away from a seat in the outlet flow passageway so that the fluid ahead of the piston is relieved to the reservoir, allowing the cylinder to be withdrawn by spring means to an adjustable set starting point.

DESCRIPTION OF A PREFERRED EMBODIMENT

Figure 1:
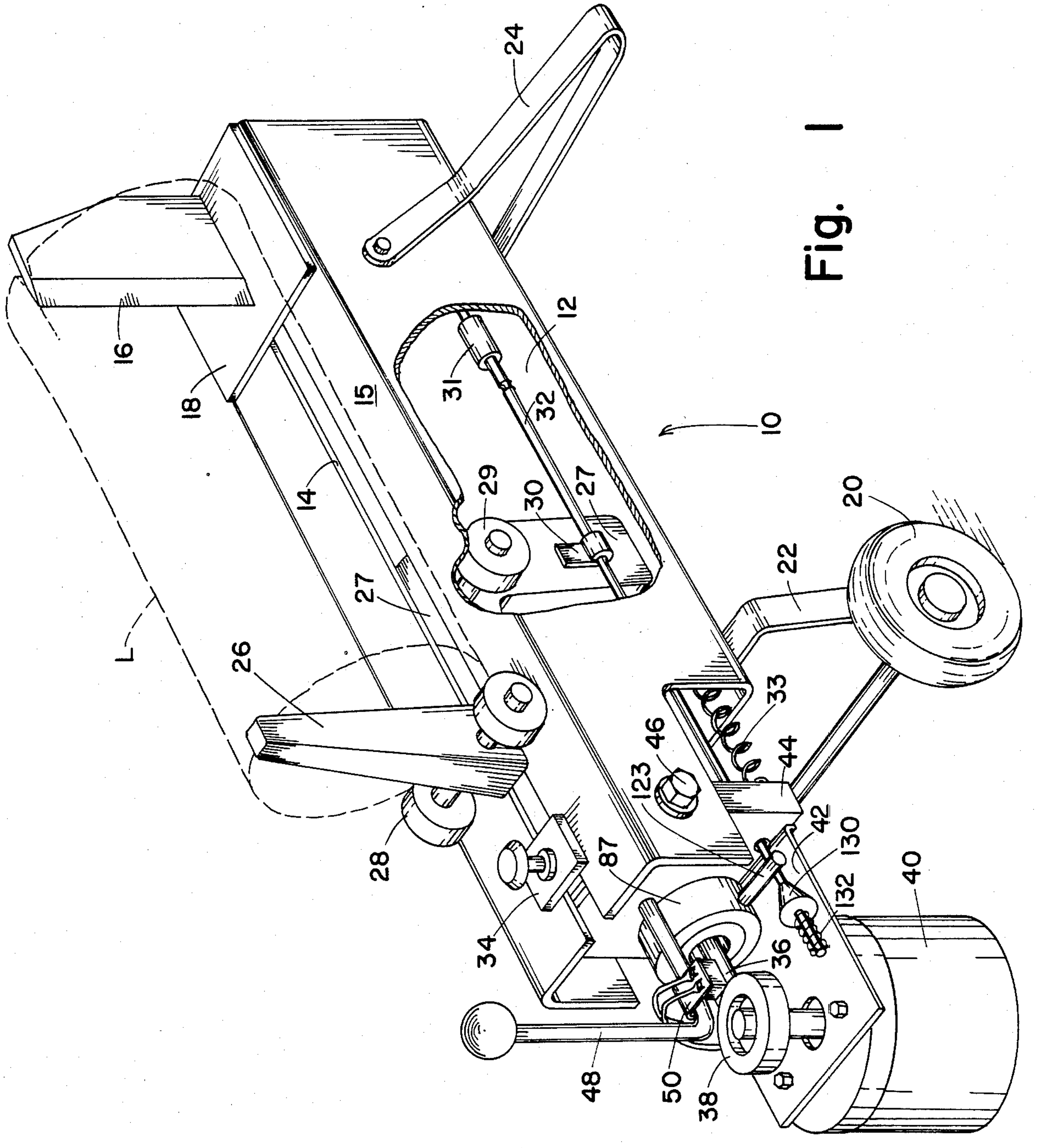
FIG. 1 is a view in perspective of a log splitter embodying features of this invention.

Referring now to FIG. 1 with greater particularity, the log splitter 10 of this invention is carried in a tubular box frame 12 having a slot 14 along the top surface. An upright splitting blade 16 is secured to the box frame 12 as by welding it to a base plate 18. For greater portability, the box frame 12 may be mounted on wheels 20 which are carried on brackets 22 at one end of the box frame 12. A combination pull bar and leg support 24 may be pivoted at the other end of the box frame 12.

An upright push block 12 is mounted on a trolley or carriage 27 that carries wheels 28 to roll along the top web 15 of the frame 12 and counter-balancing wheels 29 to roll along the undersurface of the web 12 and prevent tilting of the push block 26 and carriage 27 under resistance of a log L interposed between the pusher 26 and the splitting blade 16.

The pusher trolley 27 is moved along the top plate 15 by a hydraulic cylinder, as will hereinafter be described and, at the end of the stroke as determined by engagement of a sleeve 30 with a collar 31 on a cam rod 32, the trolley 27 is returned by powerful springs 33. An adjustable stop 34 may be set in the slot 14 in accordance with the length of the log so that the initial part of the next hydraulic stroke is not wasted in idle travel.

The hydraulic system is actuated by a pumping rod 36, which is eccentrically driven at 38 from a motor 40, the motor being carried on a mounting plate 42 welded to a rectangular collar 44 which, in turn, is bolted to the frame 12 at 46. A hand lever 48 is turned to close an electric switch 50 and energize the motor 40 and, as will hereinafter be described, to activate the hydraulic system.

Figure 2:
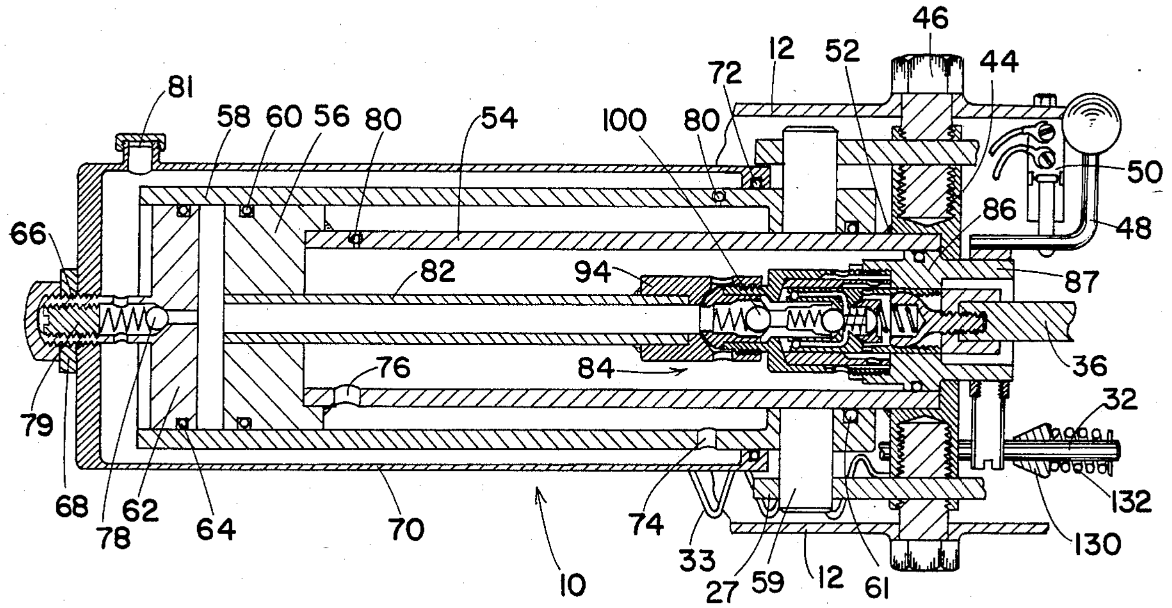
FIG. 2 is a vertical section view of the hydraulic system for operating the log splitter.

Referring now to FIG. 2, the collar 44, which is bolted to the frame 12 is welded at 52 to a hollow piston rod 54 carrying a piston 56 which is slidably received in a hydraulic cylinder 58, the piston being sealed at 60 and the piston rod at 61. A cylinder head 62 is received in the end of the cylinder 58 and is provided with seals, such as "O" rings 64. Secured on to the cylinder as by means of a threaded extension 66 receiving a nut 68, is a cylindrical reservoir 70 that is sealed around the other end of the cylinder at 72. Hence, the hydraulic system for the log splitter 10 has its own self-contained reservoir 70 with flow openings at 74 bringing the reservoir 70 into communication with the interior of the cylinder 58. Additional flow ports 76 in the hollow piston rod enable flow of the reservoir fluid to and from the interior. A safety check valve 78 at the closed end of the cylinder 58 is set by an adjustable plug 79 to enable fluid in the cylinder 58 to be relieved when pressures are excessive. Air lock vent valves 80 may be provided at the upper sides of the hollow piston 54 and the cylinder 58, and, if desired, an air vent 81 may be provided in the surrounding reservoir 70. A central passageway or flow tube 82 provides a passageway for flow of fluid from the hydraulic actuator mechanism 84 to be described, to the head of the piston 56.

Figure 3:
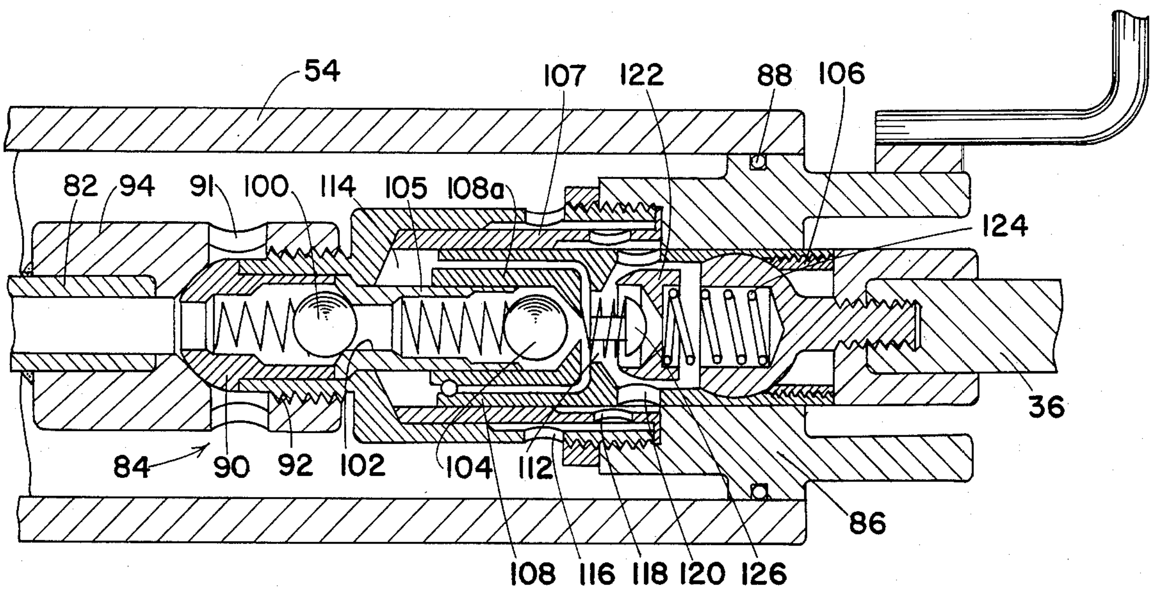
FIG. 3 is an enlarged partial section view showing the reciprocating pump during intake stroke.
Figure 4:
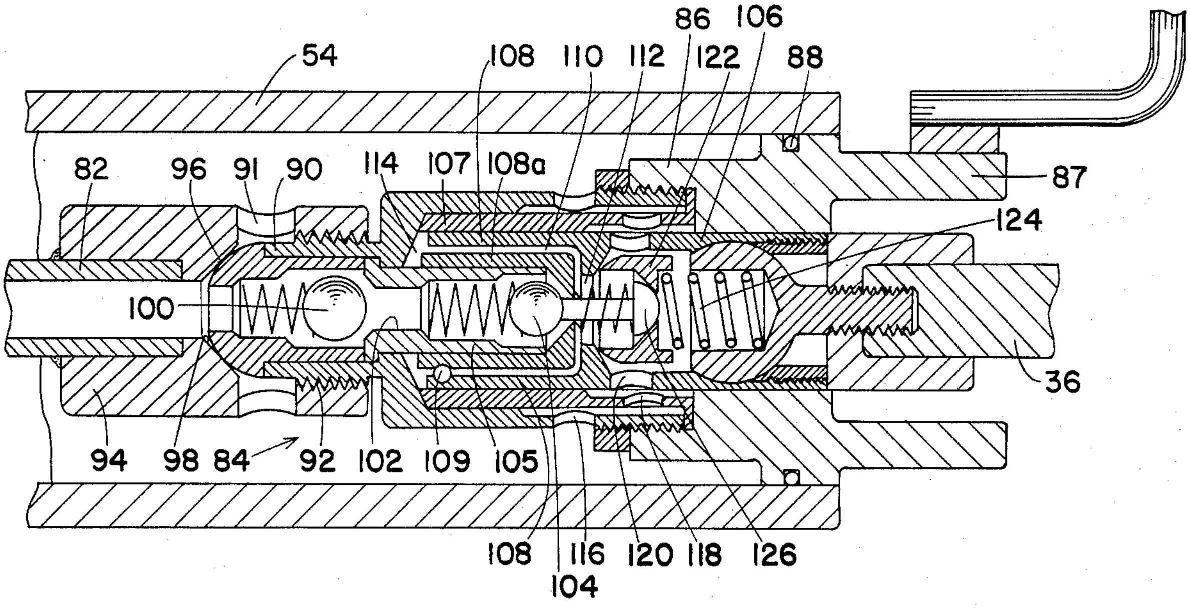
FIG. 4 is an enlarged partial section view showing the pump in its working stroke.
Figure 6:
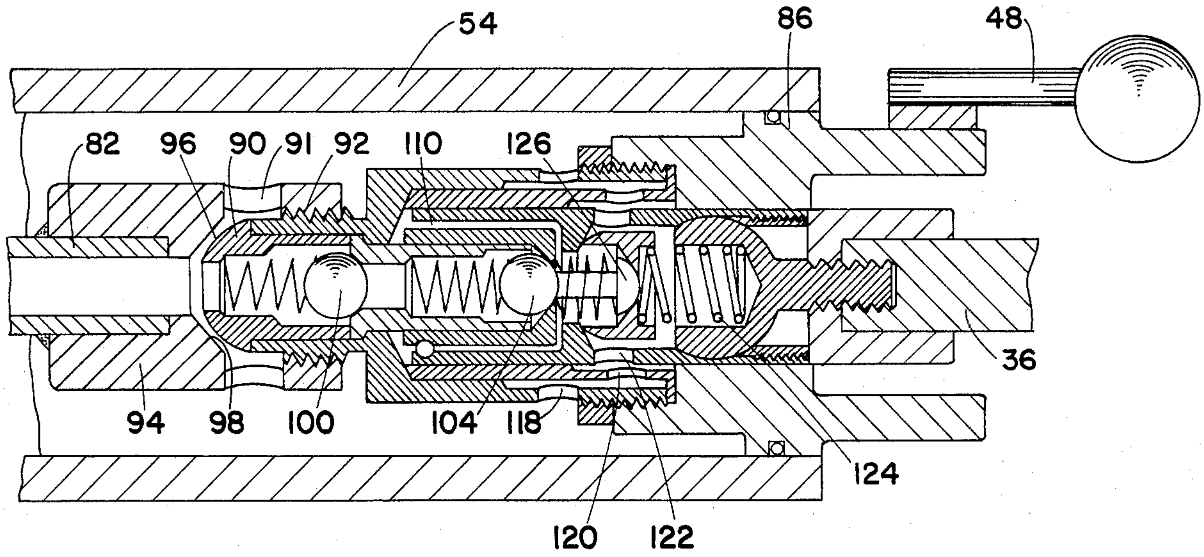
FIG. 6 is a partial section view of the pump with system relieved on completion of a stroke.

Referring now to FIGS. 3 and 4, the operation of the hydraulic actuator 84 will be described. Specifically, the control mechanism 84 comprises a valve housing 86 that is received in the hollow piston rod 54 where it is sealed at 88. A plug portion 90 at the forward end of the housing 88 is threaded at 92 in a valve seat receptacle 94 that is welded onto the central flow tube 82. A spherical nose 96 on the plug portion 90 engages a conical seat 98 in the receptacle 94 to form a sealed continuation of the central flow tube 82, with a one-way check valve 100 normally enabling flow outward only to the face of the piston 58. However, when the housing 86 is turned through approximately 90°, the nose 96 is threaded back away from the seat 98, as shown in FIG. 6, to relieve the flow passageway 82 and allow evacuation of the cylinder 58 into the hollow piston rod 54 and, hence, the reservoir 70.

The central passageway 102 of the nose portion 90 in which the main check valve 100 is situated, also carries a first stage one-way ball check valve 104 in a tubular, rearward extending cylindrical transfer tube guide 105, the check valve 104 enabling flow in one direction only into the passageway 102 to exit past the main check valve 100. The rapidly reciprocating rod 36 carries a plunger 106 that is slidable in a smoothly finished sleeve 107 mounted in the housing 86. On the end of the plunger 106 is a cup 108 that also slides on the cylindrical transfer tube guide 105. The cup 108 has an annular flow passageway or series of flow passageways 110 that extend radially outward from an intake port 112 in the bottom of the cup and then through its cylindrical wall to enable flow to the annular space 114 around the cylindrical guide 105. In manufacture, the cup 108 may simply include a small concentric inner cup 108*a*, which is held in place by balls 109 carried in slots, thus forming the annular passage 110 around it.

Lateral flow ports 116, 118 and 120 are provided in the housing 86, the finished sleeve 107, and the hollow plunger 106, respectively, to enable flow of oil from the reservoir 70 into the hollow plunger. A valve plug 122 in the hollow plunger 106 is biased against the port 112 by means of an adjustable spring 124, and carries a second stage check valve 126 that enables flow through the back of the plug 122 and through the port 112 in the bottom of the cup 108.

In operation, with the plunger 106 retracted to the position shown in FIG. 3, oil is drawn in through the lateral ports 118, 120 and 116 into the hollow plunger 106 to flow past the ball check valves 126 and 104 to fill the cup as well as the annular space 114 around the cylindrical guide transfer tube 105. Then, as the plunger starts forward to its extended position shown in FIG. 4, the second stage check valve 126 is closed and fluid flows from the annular space 114 through the flow passages 110 and past the first stage check valve 104 to flow, with the fluid contained in the cup 108 past the main check valve 100 and out the central flow passageway 82, driving the cylinder head 62, together with the cylinder 58 and reservoir 70 forward to move the carriage or trolley 27 forward an increment through yoke pins 59, pushing a log L against the blade 16.

The incremental movement continues until the full stroke of the cylinder 58, as determined by a conical cam 130, which is carried on the rod 32 (FIGS. 1 and 2). That is, when the cylinder 58 reaches the end of its stroke, the sleeve 30 carried thereby engages the collar 31, causing the rod 32 to move therewith against the force of the spring 132 so that the conical cam 130 engages an arm 123. The arm 123 is welded to a tubular extension 87 of the actuator housing 86, so that engagement by the cam 130 turns the housing 86 through a partial rotation to unthread the nose portion 90 as shown in FIG. 6, and relieve the hydraulic system through lateral ports 91 in the sleeve 94. This enables the springs 33 to retract the carriage 27 to the position set by the adjustable stop 34. The operator can then simply turn a split portion of the log L on the housing 12 and turn the lever 48, which is welded to the housing extension 87, to reactivate the hydraulic system as just described.

Figure 5:
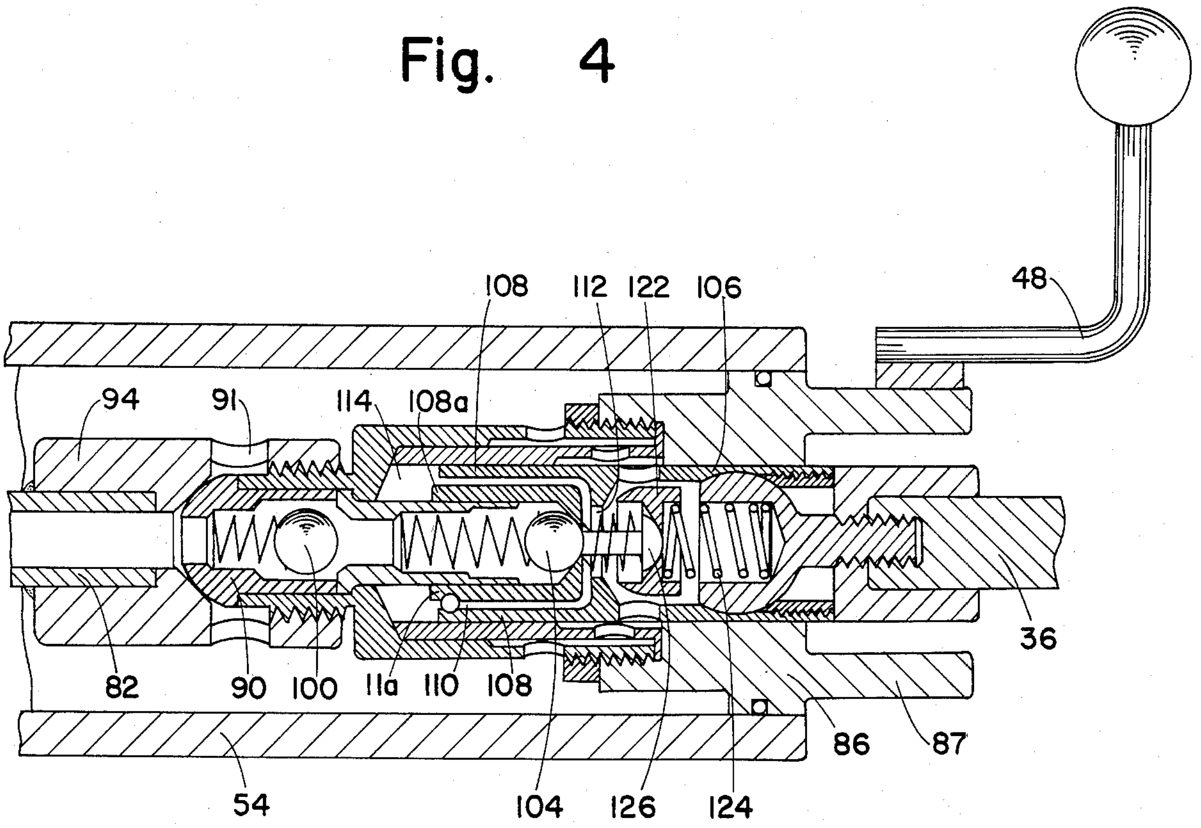
FIG. 5 is an enlarged partial section view of the pump in high pressure mode.

Referring now to FIG. 5, in the event that the pusher carriage 27 encounters substantial resistance, as by cutting through a knot, the pressure in the central flow tube 82 will tend to build up to force the check balls 100 and 104 against their seats. When this pressure reaches a level sufficient to overcome the relatively strong spring 124 behind the valve plug 122 against which the check valve 126 seats, the plug 122 will back away from the port 112 to allow the fluid in the annular space 114 to flow out through the passageway 110 between the cups 108 and 108*a* and out the lateral ports 120 and 118 and back to the reservoir. Then, continued extension of the pump plunger will drive just that fluid inside of the check ball 104 to flow out past the main check valve 100 and into the flow passageway 82. Since the force of the plunger rod 36 is distributed over a smaller area, a greater unit pressure is delivered past the ball check 100 to act against the cylinder head 62 and to overcome the increased resistance. As soon as the cutting knife 16 penetrates the knot or other resistance, the pressure is reduced and the entire area, both within the inner cup 108 and in the annular space 114 acts to deliver a low pressure, but at a higher volume and hence, greater velocity.

While this invention has been described in conjunction with a preferred embodiment thereof, it is obvious that modifications and changes therein may be made by those skilled in the art to which it pertains, without departing from the spirit and scope of this invention, as defined by the claims appended thereto.

What is claimed as invention is:

1. A hydraulic force-delivering tool comprising:

a hydraulic cylinder having a cylinder head at one end thereof;

a piston slidably received in said cylinder;

an inlet opening into said cylinder between said piston and said cylinder head; and a hydraulic actuator pump;

said hydraulic actuator pump comprising:

a valve body having a cylindrical bore therein;

a forward end of said valve body connected to said inlet to seal therearound;

means forming a flow passageway through said forward end of said valve body;

a main power check valve in said flow passageway forming means enabling flow only outward of said valve body;

a hollow plunger movable axially in said bore;

drive means operative when actuated to reciprocate said plunger;

a cylindrical cup carried on the forward end of said plunger and slidable in said cylindrical bore;

a cylindrical tubular guide in said valve body extending rearward from said flow passageway forming means and slidably receiving said cup;

said bore being larger than said tubular guide to form an annular space around said tubular guide ahead of said cup;

a hydraulic reservoir around said valve body;

a first lateral inlet port in said valve body opening into said bore;

a second lateral inlet port in said hollow plunger;

first-stage load port means opening through the bottom of said cylindrical cup;

a first-stage one-way check valve engageable with said first stage port means and enabling inward flow only therethrough;

load duct means from within said hollow plunger to said first-stage load port means;

a valve seat in said load duct means;

a high volume check valve engageable with said valve seat to enable inward flow only;

second stage duct means from said load duct means to said annular spaces, and pressure responsive means inactivating said high volume check valve to bypass same in response to an increase in pressure in said load duct means above a predetermined level.

2. The force-delivering tool defined by claim 1 including:

selectively operated means for retracting said forward end from said inlet to render said actuator ineffective.

3. The force-delivering tool defined by claim 1 wherein said pressure-responsive means comprises:

a relief valve seat in said hollow plunger around said load duct means forward of said high volume check valve;

a valve plug operative to seal against said relief valve seat;

said load duct valve seat being carried on said valve plug; and a spring biasing said valve plug against said relief valve seat.

4. The force-delivering tool defined by claim 2 wherein said selectively operated means comprises:

a sealing surface around said inlet;

said forward end of the valve body being formed to seal against said sealing surface;

said valve body being threadedly engaged in said inlet so as to move axially upon partial rotation thereof; and means for imparting limited rotary motion to said valve body.

5. The force-delivering tool defined by claim 4 wherein said last-named means comprises:

a handle fixed to said valve body.

6. The force-delivering tool defined by claim 4 wherein said last-named means comprises:

complementary cam members on said cylinder and said valve body engagable when relative axial movement between said cylinder and said piston traverses a predetermined stroke.

7. The force-delivering tool defined by claim 1 wherein:

said hydraulic reservoir is formed by said cylinder and a hollow piston rod carrying said piston, there being a communication port through the wall of said piston rod near said piston.

8. The force-delivering tool defined by claim 7 including:

a reservoir casing embracing and sealed around said cylinder; and a communication opening through the wall of said cylinder near said open end thereof so that said casing, cylinder and piston rod form a hydraulic reservoir.

9. The force-delivering tool defined by claim 8 including:

air vent holes in top portions of said piston rod wall and said cylinder; and check valve in said vent holes enabling outward flow only.

10. The force-delivering tool defined by claim 1 including:

a stationary track;

a carrier movable along said track;

first securing means fixing said piston to said track;

second securing means fixing said cylinder to said carrier;

a first work member on said track; and a second work member on said carrier.

11. The force-delivering tool defined by claim 10 wherein:

one of said work members is a pusher member; and the other of said work members is an upright blade.

12. The force-delivering tool defined by claim 1 including:

a generally horizontal box beam including a top wall and side walls;

means forming a slot along the top wall of said box beam from one end thereof;

an upright blade fixed to said top wall at the other end of said box beam;

first securing means fixing said piston to said one end of the box beam;

a carrier within said box beam;

an upright pusher on said carrier extending upward through said slot; and second securing means attaching said carrier to said cylinder.

* * * * *